United States Patent

Usui

(10) Patent No.: US 11,907,492 B2
(45) Date of Patent: Feb. 20, 2024

(54) UNDERWATER INPUT APPARATUS AND CONTROL CIRCUIT OF THE SAME

(71) Applicant: ROHM CO., LTD., Kyoto (JP)

(72) Inventor: Hirotoshi Usui, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/991,985

(22) Filed: Nov. 22, 2022

(65) Prior Publication Data

US 2023/0085341 A1 Mar. 16, 2023

Related U.S. Application Data

(63) Continuation of application No. PCT/JP2021/018088, filed on May 12, 2021.

(30) Foreign Application Priority Data

May 22, 2020 (JP) ................................ 2020-089852

(51) Int. Cl.
G06F 3/041 (2006.01)
G06F 3/044 (2006.01)

(52) U.S. Cl.
CPC .......... *G06F 3/0448* (2019.05); *G06F 3/0414* (2013.01); *G06F 3/0416* (2013.01)

(58) Field of Classification Search
CPC .. G06F 3/0414; G06F 3/0416; G06F 3/04166; G06F 3/044; G06F 3/0448; G06F 1/3206; H01H 36/00
See application file for complete search history.

(56) References Cited

U.S. PATENT DOCUMENTS

| 6,730,863 | B1 * | 5/2004 | Gerpheide | G06F 3/0445 |
| | | | | 345/174 |
| 9,904,427 | B1 * | 2/2018 | Co | G06F 3/0412 |
| 2016/0291796 | A1 * | 10/2016 | Ho | G06F 1/1656 |
| 2018/0234624 | A1 * | 8/2018 | Lee | H04N 23/62 |
| 2019/0064965 | A1 * | 2/2019 | Yoon | G06F 3/0445 |

(Continued)

FOREIGN PATENT DOCUMENTS

| JP | 2009230852 A | * 10/2009 |
| JP | 2009230852 A | 10/2009 |

(Continued)

OTHER PUBLICATIONS

International Search Report for International Application No. PCT/JP2021/018088; dated Aug. 3, 2021.

(Continued)

*Primary Examiner* — Ryan A Lubit
(74) *Attorney, Agent, or Firm* — CANTOR COLBURN LLP (57) ABSTRACT

A control circuit controls an input apparatus to be used underwater. A sense pin is coupled to a sensor electrode arranged so as to allow the user wearing equipment to touch the sensor electrode. A capacitance sensor is coupled to the sense pin, and detects the electrostatic capacitance formed by the sensor electrode. When the electrostatic capacitance Cs detected by the capacitance sensor becomes lower than a predetermined threshold value, the processing unit judges that a touch input by the user has occurred.

7 Claims, 8 Drawing Sheets

(56) References Cited

U.S. PATENT DOCUMENTS

2019/0384451 A1* 12/2019 Hu ............... G06F 3/04166
2020/0409491 A1* 12/2020 Maharyta ........... G06F 3/04166

FOREIGN PATENT DOCUMENTS

JP       2012084453 A  *   4/2012
JP       2012084453 A     4/2012

OTHER PUBLICATIONS

PCT International Preliminary Report on Patentability dated Nov. 17, 2022 for International Application No. PCT/JP2021/018088 with Written Opinion of the International Searching Authority; dated Aug. 3, 2021.

* cited by examiner

TOUCH BY
GLOVE SUBSTITUTION

UNDERWATER INPUT APPARATUS AND CONTROL CIRCUIT OF THE SAME

CROSS REFERENCE TO RELATED APPLICATIONS

This application is a continuation under 35 U.S.C. § 120 of PCT/JP2021/018088, filed May 12, 2021, which is incorporated herein by reference, and which claimed priority to Japanese Application No. 2020-089852, filed May 22, 2020. The present application likewise claims priority under 35 U.S.C. § 119 to Japanese Application No. 2020-089852, filed May 22, 2020, the entire content of which is also incorporated herein by reference.

TECHNICAL FIELD

The present disclosure relates to an underwater input apparatus.

DESCRIPTION OF THE RELATED ART

Various kinds of devices are provided with switches or buttons (which will be collectively referred to as "switches" hereafter) as a user interface. Such switches are roughly classified into switches employing a mechanical contact mechanism and electronic switches. As such electronic switches, switches employing an electrostatic capacitance method have begun to come into commonplace use.

Such switches employing an electrostatic capacitance method mainly include a sensor electrode and a capacitance sensor configured to measure an electrostatic capacitance formed between the sensor electrode and its surrounding region. When the sensor electrode is in an isolated state, the electrostatic capacitance of the sensor electrode is very small. When a finger or stylus approaches the sensor electrode, this increases the electrostatic capacitance. Accordingly, by measuring the electrostatic capacitance, such an arrangement is capable of detecting touch input or the proximity of a finger.

If an electric path occurs due to adhesion of water to the surface of a panel in which the sensor electrode is embedded, this leads to the occurrence of capacitance in parallel with the electrode, leading to an increase of electrostatic capacitance. This leads to false detection of touch input. Accordingly, such a switch employing the electrostatic capacitance method cannot be employed in devices to be used underwater. In this case, there is a need to employ a switch using a mechanical method. Typically, an operator underwater wears thick, waterproof gloves. Accordingly, it is difficult to perform delicate operation of a switch with the fingertips. In this state, it is not easy to press such a mechanical switch. Furthermore, in order to prevent immersion of water via a movable component, such a mechanical switch requires a countermeasure such as sealing or the like. This can become a cause of increased costs.

SUMMARY

The present disclosure has been made in view of such a situation.

An embodiment of the present disclosure relates to a control circuit configured to control an input apparatus to be used underwater, and to be operated by a user wearing equipment. The control circuit includes: a sense pin to be coupled to a sensor electrode arranged so as to allow the user to touch the sensor electrode; a capacitance sensor coupled to the sense pin, and configured to detect the electrostatic capacitance formed by the sensor electrode; and a processing unit configured such that, when the electrostatic capacitance detected by the capacitance sensor decreases as compared with a non-touch state, judgment is made that a touch input by the user has occurred.

It is to be noted that any arbitrary combination or rearrangement of the above-described structural components and so forth is effective as and encompassed by the present embodiments. Moreover, all of the features described in this summary are not necessarily required by embodiments so that the embodiment may also be a sub-combination of these described features. In addition, embodiments may have other features not described above.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

An outline of several example embodiments of the disclosure follows. This outline is provided for the convenience of the reader to provide a basic understanding of such embodiments and does not wholly define the breadth of the disclosure. This outline is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

A control circuit according to one embodiment controls an input apparatus to be used underwater, and to be operated by a user wearing equipment. The control circuit includes: a sense pin coupled to a sensor electrode arranged so as to allow the user to touch the sensor electrode; a capacitance sensor coupled to the sense pin, and configured to detect the electrostatic capacitance formed by the sensor electrode; and a processing unit configured such that, when the electrostatic capacitance detected by the capacitance sensor decreases as compared with a non-touch state, judgment is made that a touch input by the user has occurred.

In one embodiment, the input apparatus is to be used underwater, and is to be operated by a user wearing equipment. The input apparatus includes: a sensor electrode arranged so as to allow a user wearing equipment to touch the sensor electrode; a capacitance sensor configured to detect the electrostatic capacitance formed by the sensor electrode; and a processing unit configured such that, when the electrostatic capacitance detected by the capacitance sensor decreases as compared with a non-touch state, judgment is made that a touch input by the user has occurred.

In the non-touch state, the sensor electrode is surrounded by water, which can be regarded as a ground. Accordingly, an electrostatic capacitance is formed. When the user wearing the equipment touches the sensor electrode, the water in the vicinity of the sensor electrode is pushed aside, whereby the electrostatic capacitance formed by the sensor electrode becomes small. This arrangement is capable of detecting a touch input by the user based on a mechanism that is the reverse of the mechanism of typical electrostatic switches.

In one embodiment, when the electrostatic capacitance detected by the capacitance sensor becomes lower than a predetermined threshold value, the processing unit may judge that a touch input by the user has occurred.

In one embodiment, the input apparatus may be switchable between a first mode in which the capacitance sensor operates at relatively long time intervals and a second mode in which the capacitance sensor operates at relatively short time intervals. When the processing unit detects a touch input by the user in the first mode, the mode may be switched to the second mode. After a user non-touch state continues for a predetermined period in the second mode, the mode may be switched to the first mode.

In order to detect the electrostatic capacitance, the capacitance sensor repeats charging/discharging of the electrostatic capacitance. Accordingly, the power consumption of the capacitance sensor has a dominant component that is proportional to the amount of charge that occurs in the charging/discharging of the electrostatic capacitance. Accordingly, as the electrostatic capacitance to be detected becomes larger, the power consumption becomes larger. With an electrostatic capacitance switch to be used on the ground, the electrostatic capacitance in the non-touch state is small as compared with that used underwater. Accordingly, such an electrostatic capacitance switch used on the ground involves relatively small power consumption. In contrast, with an electrostatic switch used underwater, the electrostatic capacitance in the non-touch state is large as compared with that used on the ground. Accordingly, such an electrostatic capacitance switch used underwater involves relatively large power consumption. In order to solve such a problem, in the non-touch state, a polling operation is periodically (intermittently) performed at long time intervals so as to confirm the presence or absence of a touch input. Also, once a touch input has been detected, detection may be performed continuously or at short time intervals. However, with such an arrangement, this involves large power consumption in a touch state. Accordingly, with an application that requires no fine operations or time resolution, by instructing such an application to perform a polling operation even in the touch state, this allows the power consumption to be further reduced.

Embodiments

Description will be made below regarding preferred embodiments with reference to the drawings. The same or similar components, members, and processes are denoted by the same reference numerals, and redundant description thereof will be omitted as appropriate. The embodiments have been described for exemplary purposes only and are by no means intended to restrict the present disclosure or the present invention. Also, it is not necessarily essential for the present disclosure or the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electrical connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C, via another member that does not substantially affect the electrical connection between them, or that does not damage the functions or effects of the connection between them, in addition to a state in which they are directly coupled.

Figure 1:
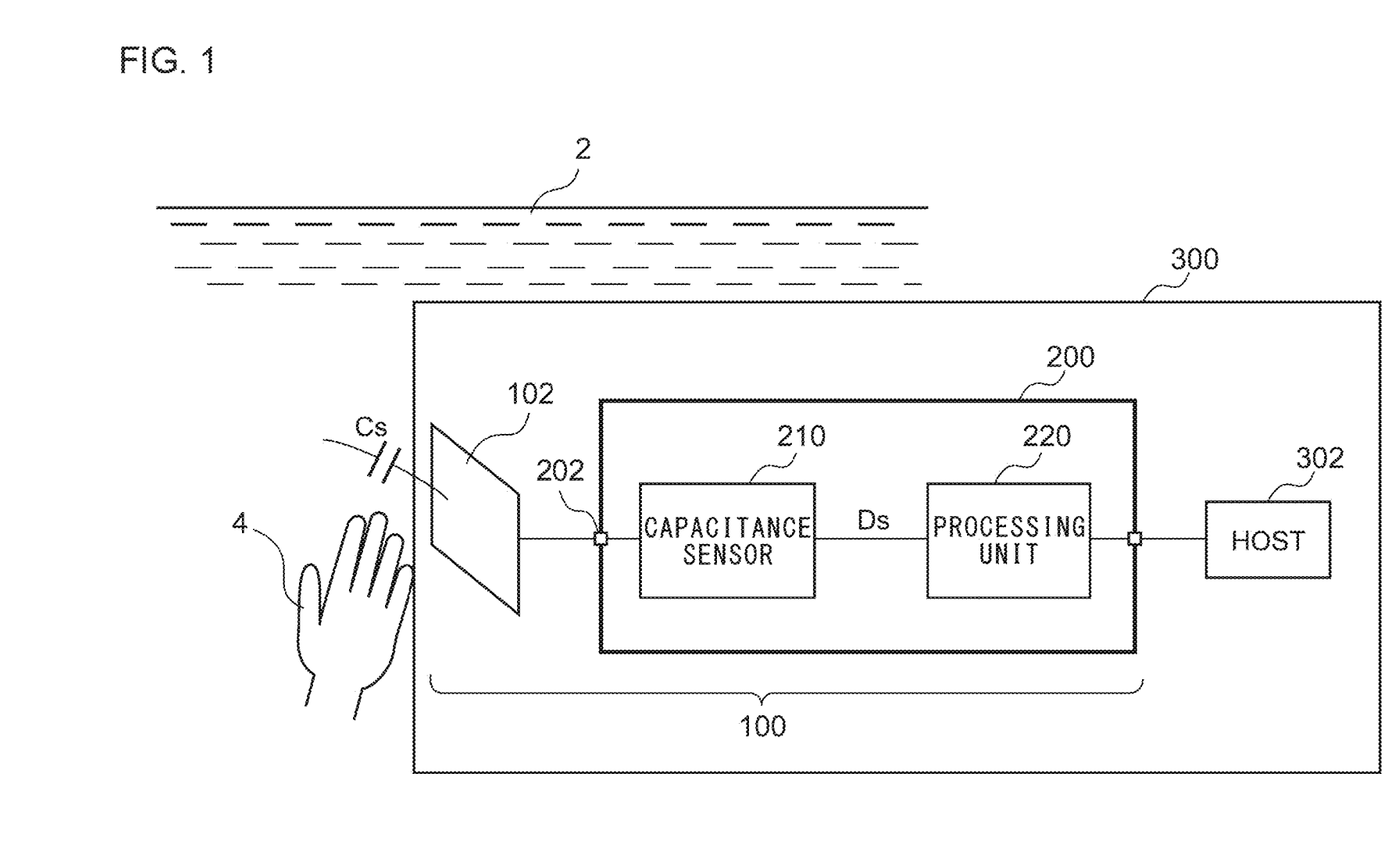
FIG. 1 is a diagram showing an input apparatus according to an embodiment.

FIG. 1 is a diagram showing an input apparatus 100 according to an embodiment. The input apparatus 100 is configured as a user interface mounted on a device or apparatus (which will also be referred to as an "underwater device 300" hereafter) intended for use underwater 2. The input apparatus 100 detects a touch input by the user. The user operates the input apparatus 100 with a hand wearing equipment 4 such as a glove or the like. As described later, the equipment 4 is required to have a material quality and a thickness such that it does not cause or does not readily cause an electrostatic capacitance between it and the sensor electrode 102 in a state in which the user touches the sensor electrode 102. That is to say, the equipment 4 is required to have sufficient insulation (non-conductivity) and to be resistant to water retention. From this viewpoint, from among commercially available diver's gloves to be used by divers, gloves having a sufficient thickness and formed of a material including air bubbles can preferably be employed as the equipment 4. Alternatively, the equipment 4 may be designed as dedicated equipment for use in combination with the input apparatus 100.

The input apparatus 100 includes the sensor electrode 102 and a control circuit 200. The sensor electrode 102 is arranged so as to allow the user to touch it in a state in which the user wears the equipment 4. The surface of the sensor electrode 102 is not required to be directly exposed to water. Also, the surface of the sensor electrode 102 may be covered with an insulating cover.

The control circuit 200 includes a sense pin 202, a capacitance sensor 210, and a processing unit 220, which are integrated on a single semiconductor substrate as a function IC (Integrated Circuit). The sense pin 202 is coupled to the sensor electrode 102. The capacitance sensor 210 detects an electrostatic capacitance Cs formed due to the sensor electrode 102, and generates a detection value Ds that indicates the electrostatic capacitance Cs. For example, the capacitance sensor 210 includes a capacitance detection circuit using a self-capacitance method and an A/D converter. The capacitance detection circuit is a CN conversion circuit that converts the electrostatic capacitance of the sensor electrode 102 into a voltage signal. The capacitance detection circuit may be configured using a known technique. The A/D converter converts an output signal of the capacitance detection circuit into a digital detection value Ds.

When the detection value Ds of the electrostatic capacitance Cs decreases as compared with a non-touch state, the processing unit 220 judges that a user touch input has occurred.

For example, when the electrostatic capacitance Cs detected by the capacitance sensor 210 has dropped below a predetermined threshold value TH, the processing unit 220 judges that a user touch input has occurred. The threshold value TH may be fixed. Also, the threshold value TH may be relatively determined with the detection value measured in a non-touch state as a reference. The judgment result obtained by the processing unit 220 is output to a host controller 302 of the underwater device 300. Upon detecting a touch input, the host controller 302 executes predetermined processing.

Figure 2A:
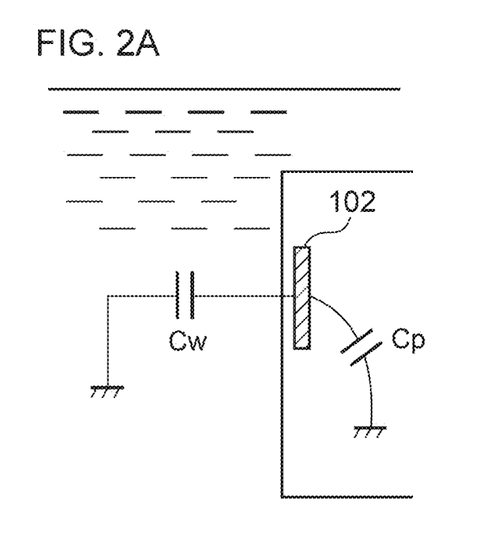
FIG. 2A and FIG. 2B are diagrams for explaining the operating principle of the input apparatus shown in FIG. 1.

The above is the configuration of the input apparatus 100. Next, description will be made regarding the operation thereof. FIG. 2A and FIG. 2B are diagrams for explaining the operation principle of the input apparatus 100 shown in FIG. 1. FIG. 2A shows a non-touch state. In the non-touch state, a very large electrostatic capacitance Cw is formed between the sensor electrode 102 and water. The electrostatic capacitance Cs detected by the capacitance sensor 210 is the sum total of the capacitance Cw that is formed between the sensor electrode 102 and water and a parasitic capacitance Cp, i.e., a combined capacitance (Cw+Cp).

Figure 2B:
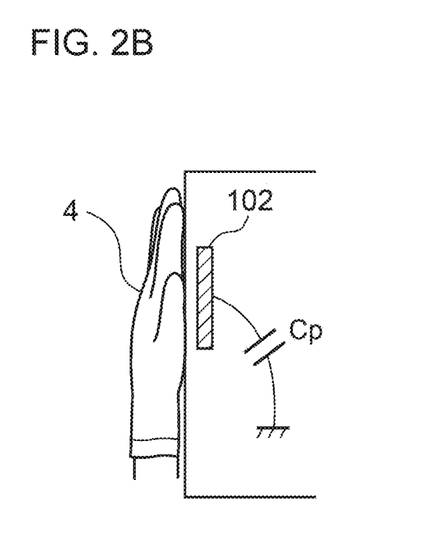

FIG. 2B shows a touch state. In the touch state, water in the vicinity of the sensor electrode 102 is pushed aside by the equipment 4, whereby the electrostatic capacitance Cw becomes very small. In this state, the electrostatic capacitance Cs detected by the capacitance sensor 210 is approximately equal to Cp. That is to say, the electrostatic capacitance in the touch state becomes very small as compared with that in a non-touch state.

Figure 3:
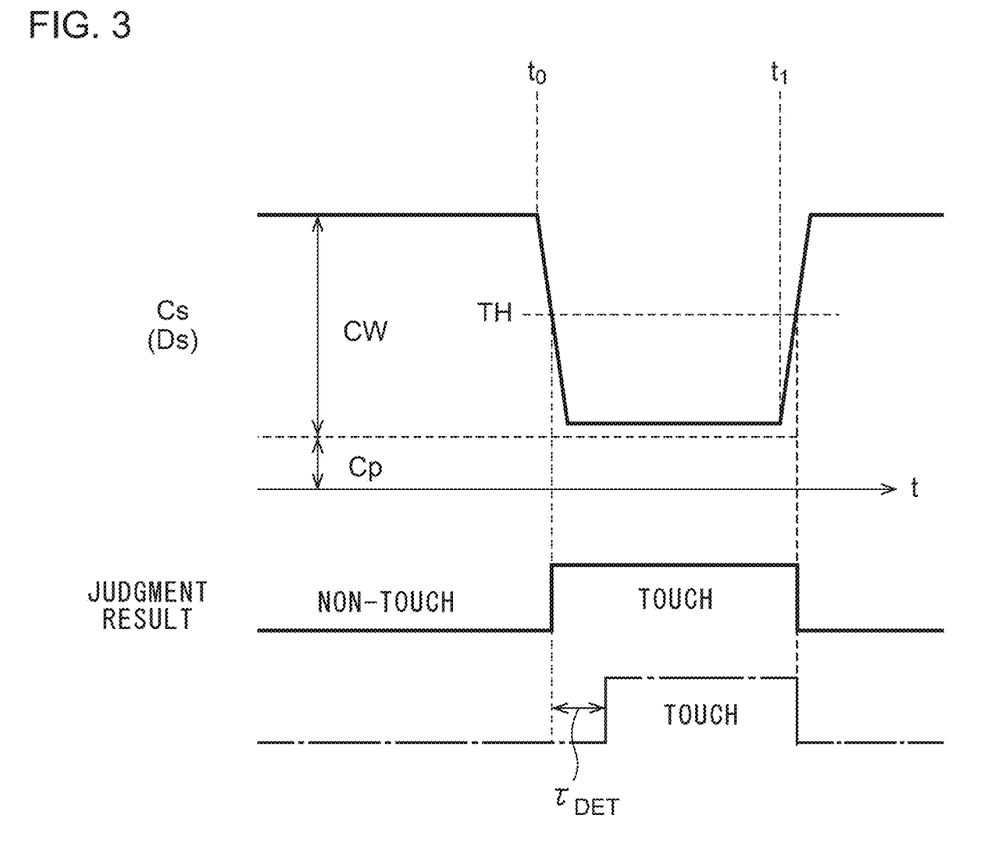
FIG. 3 is a time chart showing an example of the change of the electrostatic capacitance Cs.

FIG. 3 is a time chart showing an example of the change in the electrostatic capacitance Cs. Before the time point to, the electrostatic capacitance Cs is in a non-touch state. Accordingly, the detection value Ds of the electrostatic capacitance Cs is large. After the time point to when the user touches the sensor electrode 102, the detection value Ds decreases. After the time point $t_1$ when the user moves his/her hand away from the sensor electrode 102, the detection value Ds returns to the original value.

The lower diagram in FIG. 3 shows judgment results obtained by the processing unit 220. When the detection value Ds is higher than the threshold value TH, judgement of the non-touch state is made. When the detection value Ds is lower than the threshold value TH, judgement of the touch state is made.

It should be noted that, specifically, a judgement algorithm employed by the processing unit 220 is not restricted in particular. For example, when a state in which the detection value Ds is lower than the threshold value TH continues for a predetermined judgment time $\tau_{DET}$, judgment of touch input may be made. In this case, judgment results are obtained as indicated by the line of alternately long and short dashes. With such an arrangement in which the judgment time $\tau_{DET}$ is provided, this is capable of preventing false detection due to noise.

The above is the operation of the input apparatus 100. With the input apparatus 100, this is capable of providing an underwater interface using an electrostatic switch. In a state in which the user wears gloves, it is difficult to operate a conventional fine button mechanism. In contrast, with the input apparatus 100, this enables touch input, and accordingly, this does not require the user to perform a fine operation. This provides the underwater device 300 with improved operability. Also, the sensor electrode 102 may be arranged in a closed space included within a housing. Such an arrangement does not require sealing or the like, thereby allowing the cost to be reduced.

Figure 4A:
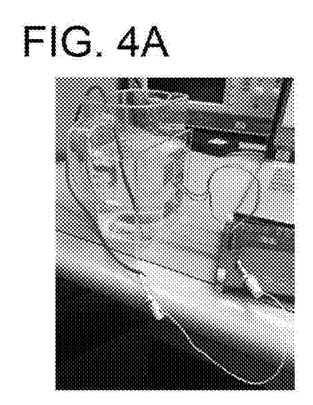
FIG. 4A through FIG. 4C are photographs showing an experiment setup.
Figure 4B:
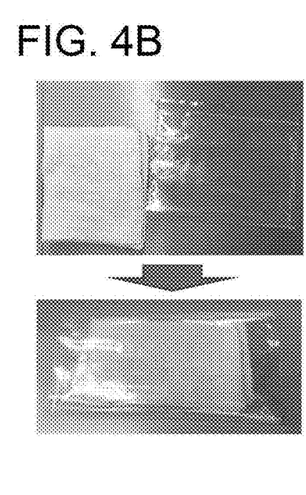
Figure 4C:
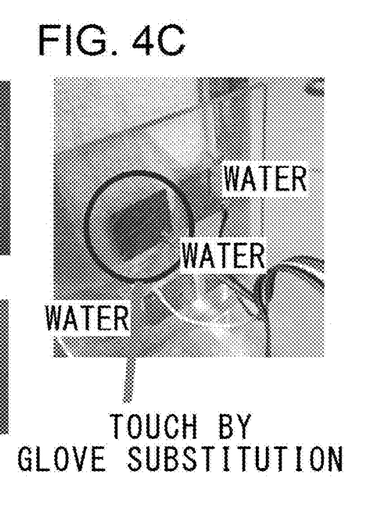

Description will be made regarding a proof-of-principle experiment. FIG. 4A through FIG. 4C are photographs showing the experiment setup.

As shown in FIG. 4A, four electrodes are attached to a side face of a container storing water, and the electrostatic capacitance is measured for each of the four electrodes. As shown in FIG. 4B, a cloth put into a plastic bag is employed as a substitute for the equipment 4. As shown in FIG. 4C, one electrode is covered by the glove substitute shown in FIG. 4B.

Figure 5:
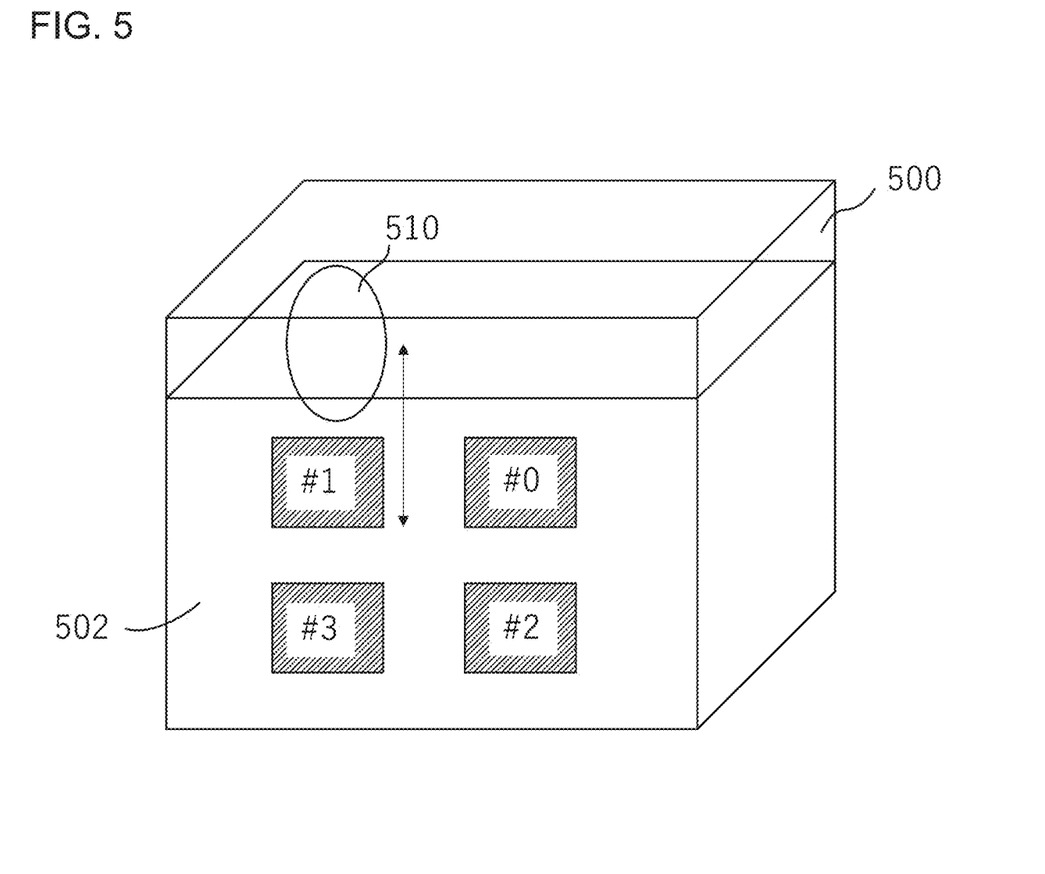
FIG. 5 is a schematic diagram showing the experiment setup.

FIG. 5 is a schematic diagram showing the experiment setup. From among the four electrodes #0 through #3, two electrodes #2 and #3 are attached to a region of a side face 502 of a container 500 closer to the bottom face thereof. The remaining two electrodes #0 and #1 are attached to the upper-side region of the side face 502 of the container 500. In the experiment, the glove substitute 510 was slid from top to bottom, then slid from bottom to top, while in contact with the electrode #1.

Figure 6:
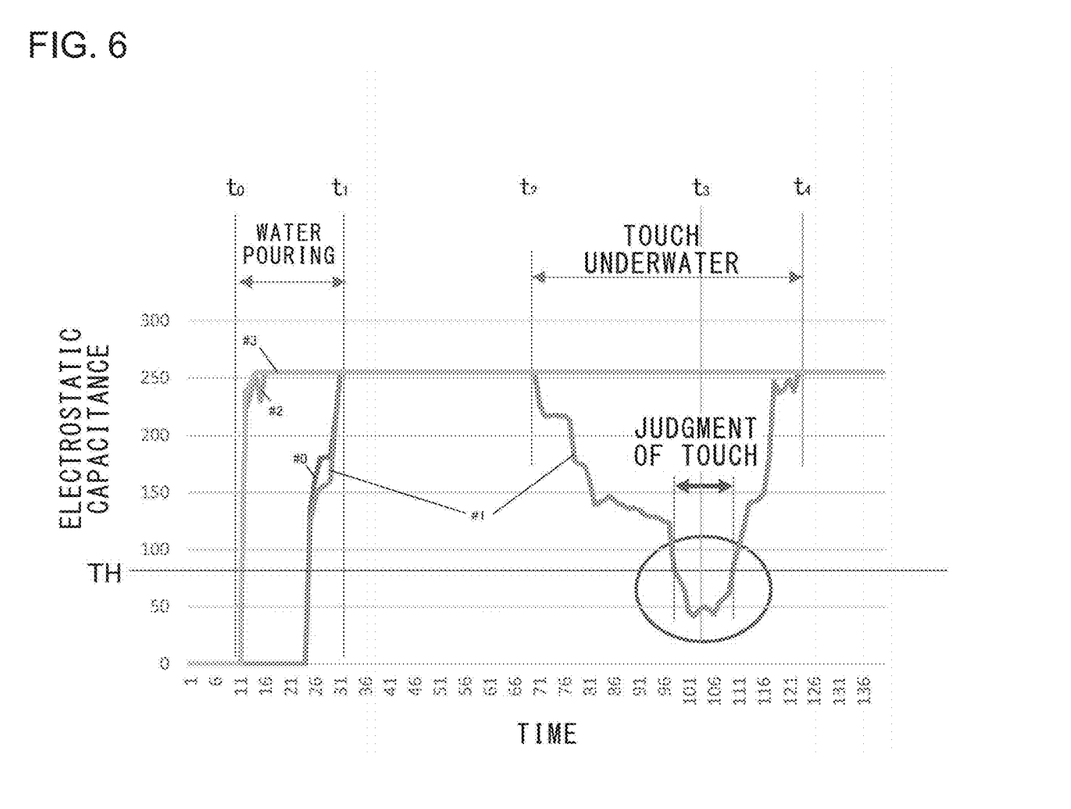
FIG. 6 is a waveform diagram showing the electrostatic capacitance measured in the setup shown in FIG. 5.

FIG. 6 is a waveform diagram showing the electrostatic capacitance measured in the setup shown in FIG. 5. Before the time point to, the container is empty. In this state, the electrostatic capacitances of the multiple electrodes each exhibit a value in the vicinity of zero (substantially zero). At the time point to, water pouring is started. The electrostatic capacitances of the two electrodes #2 and #3 arranged closer to the bottom face increase ahead of the others as the water level rises. In a state in which the two electrodes #2 and #3 are completely submerged in water, the electrostatic capacitances of the two electrodes #2 and #3 each become their maximum value. When the water level further rises, this increases the electrostatic capacitances of the two electrodes #0 and #1 each arranged on the upper side. At the time point $t_1$ at which all the electrodes are submerged, the water pouring is stopped.

In the period between the time points $t_2$ and $t_3$, the glove substitute 510 is slid from top to bottom with the glove substitute 510 in contact with the electrode #1. At the time point $t_3$, substantially the entire region of the electrode #1 is covered by the glove substitute 510. It can be understood that the electrostatic capacitance of the electrode #1 decreases according to an increase of the ratio of the region of the surface of the electrode #1 covered by the glove substitute 510.

During a period from the time point $t_3$ to the time point $t_4$, the glove substitute 510 is slid from bottom to top with the glove substitute 510 in contact with the electrode #1. It can be understood that the electrostatic capacitance of the electrode #1 increases according to the decrease in the ratio of the region of the surface of the electrode #1 covered by the glove substitute 510.

Accordingly, a predetermined threshold value TH may be provided. With this, a state in which the electrostatic capacitance is lower than the judgment threshold value TH may be judged as the touch state. A state in which the electrostatic capacitance is higher than the judgment threshold value TH may be judged as the non-touch state. The experiment results demonstrate the effectiveness of the present invention.

The input apparatus 100 may be configured to be switchable between a first mode in which the capacitance sensor 210 intermittently operates at relatively long time intervals and a second mode in which the capacitance sensor 210 operates at relatively short time internals.

Typically, when the electrostatic capacitance Cs is detected, the capacitance sensor 210 using the self-capacitance method repeats charging/discharging of the electrostatic capacitance Cs. When the voltage change of $V_{DD}$ occurs in the repetition of charging/discharging, the amount of charge stored in the electrostatic capacitance Cs and subsequently discharged is represented by $Q = Cs \lambda V_{DD}$. That is to say, the amount of charge Q is proportional to the electrostatic capacitance Cs. Accordingly, as the electrostatic capacitance Cs becomes larger, the power consumption of the capacitance sensor 210 becomes larger. With an electrostatic switch to be used on the ground, in the non-touch state, the electrostatic capacitance is very small, and the electrostatic capacitance becomes large only in the touch state for a short period of time. Accordingly, the power consumption of the capacitance sensor 210 is small. In contrast, with the electrostatic switch to be used underwater, the electrostatic capacitance Cs is very large in the non-touch state for a long period of time, leading to large power consumption by the capacitance sensor.

Upon detecting the user's touch input in the first mode, the processing unit 220 may switch the mode to the second mode. In the second mode, when the user's non-touch state continues for a predetermined period of time, the mode may be switched to the first mode. As described above, by switching the two operating modes to be used, this allows the power consumption to be reduced in exchange for a reduction of response speed.

Figure 7:
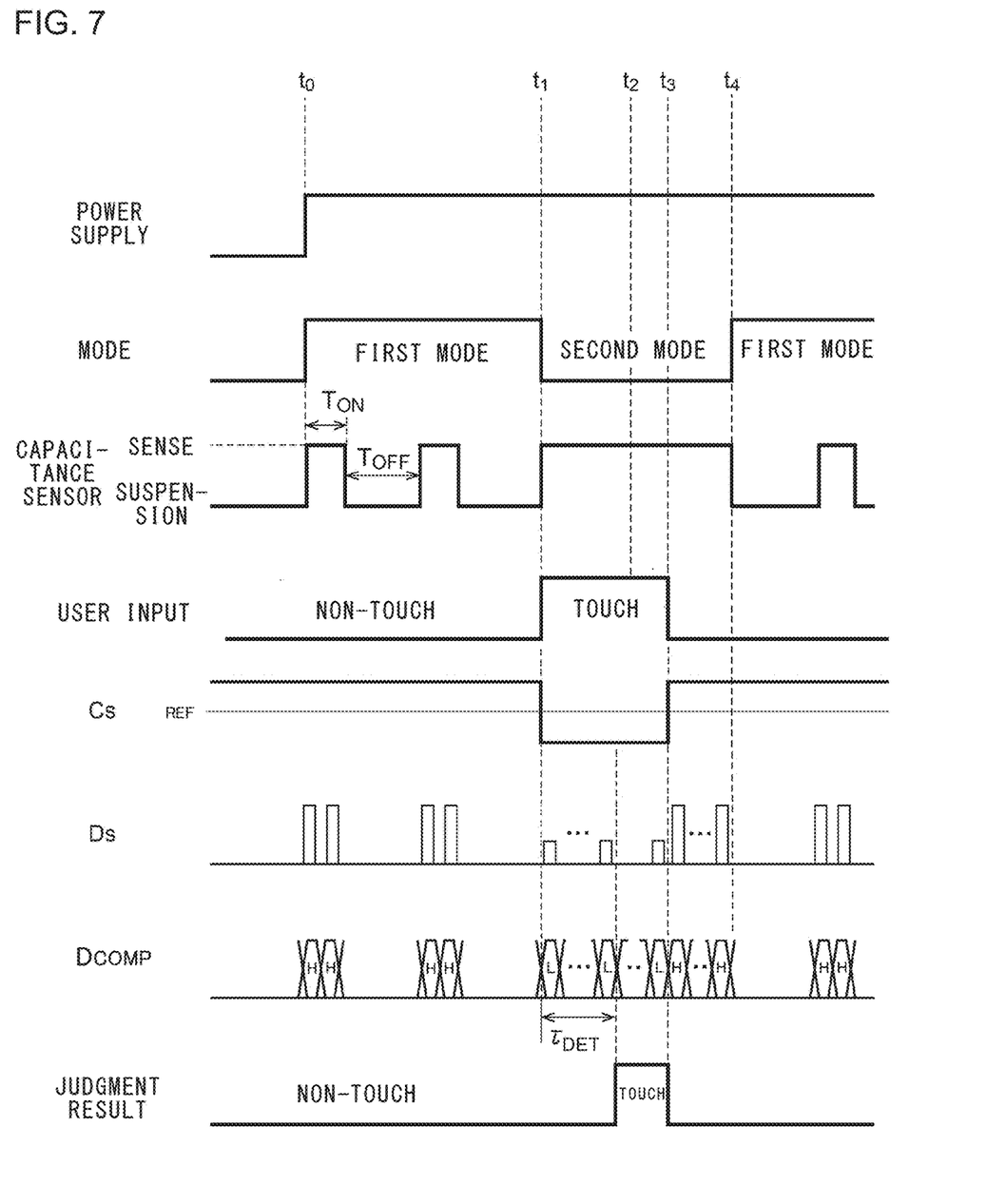
FIG. 7 is a time chart for explaining mode control.

FIG. 7 is a time chart for explaining the mode control. Before the time point to, the power supply of the underwater device 300 is turned off. When the power supply is turned on at the time point to, the input apparatus 100 is started up, and the capacitance sensor 210 starts to operate in the first mode. In the first mode, the time interval (period) of the intermittent operation in which the sense period $T_{ON}$ and the suspension period $T_{OFF}$ are alternately repeated is determined to be relatively long. The electrostatic capacitance may be detected multiple times in each sense period $T_{ON}$. In this example, sensing is executed twice, and the detection value Ds is updated twice in each sense period $T_{ON}$. In the drawing, the length of each bar that indicates the detection value Ds also indicates the amount of the electrostatic capacitance Cs. The processing unit 220 compares the detection value X with the threshold value REF and generates the comparison value $D_{COMP}$ that represents the comparison results. In this case, when X>REF holds true, the comparison value $D_{COMP}$ is set to high (H). When X<REF holds true, the comparison value $D_{COMP}$ is set to low (L).

When the user touches the capacitance sensor 210 at the time point $t_1$, the electrostatic capacitance Cs decreases. Immediately after the decrease of the electrostatic capacitance Cs, when the comparison value $D_{COMP}$ generated in the sensing is low, the mode transits to the second mode. In this mode, the operating interval (operating cycle) of the capacitance sensor 210 becomes short. In this example, the capacitance sensor 210 performs continuous operation in the second mode. In this operation, the detection value Ds and the comparison value $D_{COMP}$ are continuously generated. When M consecutive comparison values $D_{COMP}$ are low, the processing unit 220 judges that touch input has occurred at the time point $t_2$. The number M is a parameter that corresponds to the judgment period $\tau_{DET}$ described above.

When the user moves his/her hand away at the time point $t_3$, this increases the electrostatic capacitance Cs. Accordingly, the detection value Ds becomes larger. Upon detecting the high comparison value $D_{COMP}$, the processing unit 220 judges that the non-touch state has occurred. Subsequently, upon detecting N consecutive high comparison values $D_{COMP}$, the mode returns to the first mode at the time point $t_4$, thereby providing intermittent sensing. In particular, this control is preferably employed in usages employing a long judgment time $\tau_{DET}$.

It should be noted that, immediately after the first low comparison value $D_{COMP}$ at the time point $t_1$, the processing unit 220 may judge that a touch input has occurred. That is to say, the judgment time $\tau_{DET}$ may be set to zero.

Also, in usages that do not require fine operations or a fine time resolution, a polling operation (intermittent operation) may also be performed in the touch state. This allows power consumption to be further reduced.

Usages

Figure 8:
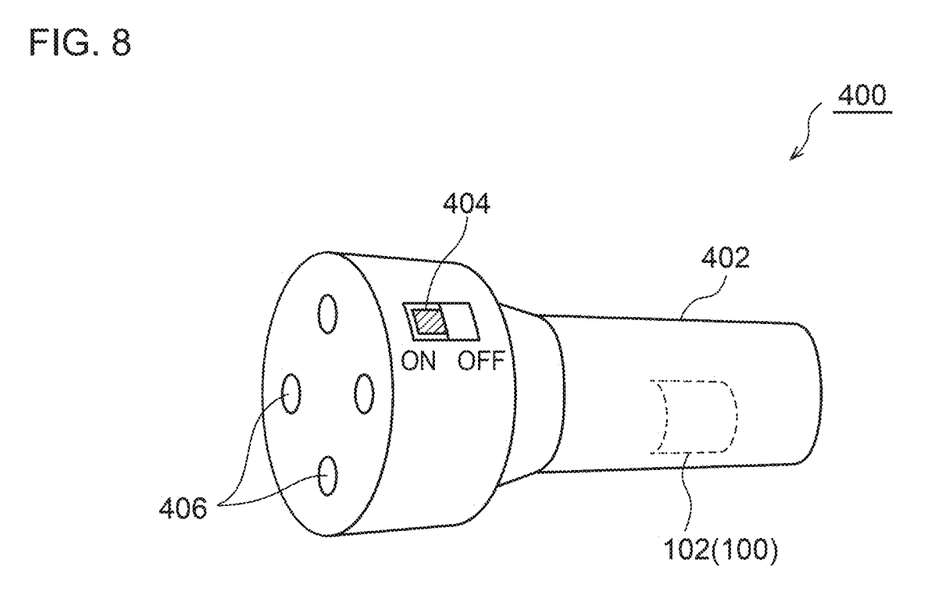
FIG. 8 is a diagram showing an underwater light which is an example of an underwater device.

Next, description will be made regarding specific examples of the underwater device 300. FIG. 8 is a diagram showing an underwater light 400 which is an example of the underwater device 300. In addition to the input apparatus 100 described above, the underwater light 400 includes a housing 402, a main switch 404, and a light source 406. The main switch 404 is for a main power supply. Upon turning on the main switch 404, the underwater light 400 enters the operating state. The main switch 404 is configured as a mechanical contact switch. The main switch 404 may be configured as a button switch or a slide switch. The input apparatus 100 is provided within the housing 402. The sensor electrode 102 is arranged at a position that allows the user to easily operate the underwater device 300. The light source 406 is switched between the lighting-on state and lighting-off state according to the main switch 404 and the detection result of the input apparatus 100. For example, an arrangement may be made in which, during a period in which the touch input is detected, the light source 406 is turned on.

The above is the configuration of the underwater light 400. Next, description will be made regarding the operation thereof. On the water, the user such as a diver or the like turns on the main switch 404. On the ground, the electrostatic capacitance Cs of the sensor electrode 102 is small. Accordingly, even when the user does not touch the sensor electrode 102, the input apparatus 100 judges that the state is the touch state. As a result, the underwater light 400 temporarily turns on. With this, this allows the user to check the battery state, to check whether or not a malfunction has occurred, etc.

When the user dives underwater with the underwater light 400, this increases the electrostatic capacitance Cs of the sensor electrode 102. Accordingly, judgment is made that a non-touch state has occurred, thereby turning off the light source 406.

Subsequently, when the user touches the sensor electrode 102 as necessary in a state in which the main switch 404 is turned on, such an arrangement is capable of turning on the light source 406 during a period in which the user touches the sensor electrode 102.

It should be noted that the input apparatus 100 may be used as a toggle switch. Specifically, an arrangement may be made in which the on/off state of the light source 406 is switched every time a touch input is detected.

The usage of the underwater device 300 is not restricted to the underwater light 400. Also, the underwater device 300 may be applied to a housing of an underwater camera, strobe light for an underwater camera, undersea working robot, etc.

The above-described embodiments have been described for exemplary purposes only. Rather, it can be readily conceived by those skilled in this art that various modifications may be made by making various combinations of the aforementioned components or processes, which are also encompassed in the technical scope of the present invention. Description will be made below regarding such modifications.

Modification 1

Description has been made regarding an example in which a simple touch input is to be detected. However, the kind of input that can be detected by the input apparatus 100 is not restricted to such a simple touch input. For example, by lengthening the judgement time $\tau_{DET}$ to on the order of seconds, this is capable of detecting a so-called long press.

Modification 2

By arranging the multiple electrodes side-by-side, and by detecting a touch input to each of the multiple electrodes, this is capable of detecting a slide input or the like.

Modification 3

Description has been made in the embodiment regarding the capacitance sensor using a self-capacitance method. However, the present invention is not restricted to such an arrangement. Also, the present invention is applicable to a capacitance sensor using a mutual capacitance method. In this case, the sensor electrode 102 may be configured as a pair of a transmission electrode and a reception electrode.

Modification 4

Description has been made in the embodiment regarding an arrangement that enables operation with the hand. However, the present invention is not restricted to such an arrangement. Also, an arrangement may be made so as to enable operation with other parts of the body such as the elbow, torso, knee, leg, etc. In this case, instead of gloves, a wetsuit, fin, or the like corresponds to the equipment.

Description has been made regarding the present disclosure with reference to the embodiments using specific terms. However, the above-described embodiments show only the mechanisms and applications of the present disclosure and/or the present invention. Rather, various modifications and various changes in the layout can be made without departing from the spirit and scope of the present invention defined in appended claims.

What is claimed is:

1. A control circuit for an input apparatus equipped in an underwater light having a light source and a main switch, the control circuit comprising:
   a sense pin to be coupled to a sensor electrode arranged so as to allow a user wearing equipment to touch the sensor electrode;
   a capacitance sensor coupled to the sense pin, and structured to detect an electrostatic capacitance formed by the sensor electrode; and
   a processing unit structured such that, when the electrostatic capacitance detected by the capacitance sensor decreases as compared with a non-touch state, judgment is made that a touch input by the user has occurred,
   wherein a result of the judgement made by the processing unit is used, in combination with the status of the main switch, for controlling on/off state of the light source.

2. The control circuit according to claim 1, wherein, when the electrostatic capacitance detected by the capacitance sensor becomes lower than a predetermined threshold value, the processing unit judges that a touch input by the user has occurred.

3. The control circuit according to claim 1, wherein the input apparatus is switchable between a first mode in which the capacitance sensor operates at relatively long time intervals and a second mode in which the capacitance sensor operates at relatively short time intervals,
   wherein, when the processing unit detects a touch input by the user in the first mode, the mode is switched to the second mode,
   and wherein, after a user non-touch state continues for a predetermined period in the second mode, the mode is switched to the first mode.

4. An input apparatus adaptive to be equipped in an underwater light including a light source and a main switch, the input apparatus comprising:
   a sensor electrode arranged so as to allow a user wearing equipment to touch the sensor electrode;
   a capacitance sensor structured to detect an electrostatic capacitance formed by the sensor electrode; and
   a processing unit structured such that, when the electrostatic capacitance detected by the capacitance sensor decreases as compared with a non-touch state, judgment is made that a touch input by the user has occurred,
   wherein a result of the judgement made by the processing unit is used, in combination with the status of the main switch, for controlling on/off state of the light source.

5. The input apparatus according to claim 4, wherein, when the electrostatic capacitance detected by the capacitance sensor becomes lower than a predetermined threshold value, the processing unit judges that a touch input by the user has occurred.

6. The input apparatus according to claim 4, wherein the input apparatus is switchable between a first mode in which the capacitance sensor intermittently operates at relatively long time intervals and a second mode in which the capacitance sensor operates at relatively short time intervals,
   wherein, when the processing unit detects a touch input by the user in the first mode, the mode is switched to the second mode,
   and wherein, after a user non-touch state continues for a predetermined period in the second mode, the mode is switched to the first mode.

7. An underwater light comprising:
   an input apparatus comprising:
      a sensor electrode arranged so as to allow a user wearing equipment to touch the sensor electrode;
      a capacitance sensor structured to detect an electrostatic capacitance formed by the sensor electrode; and
      a processing unit structured such that, when the electrostatic capacitance detected by the capacitance sensor decreases as compared with a non-touch state, judgment is made that a touch input by the user has occurred;
   a main switch; and
   a light source structured to be switched between a lighting-on state and a lighting-off state according to the main switch and a state of the input apparatus.

* * * * *